United States Patent [19]
Krill et al.

[11] Patent Number: 5,211,552
[45] Date of Patent: May 18, 1993

[54] ADIABATIC SURFACE COMBUSTION WITH EXCESS AIR

[75] Inventors: Wayne V. Krill, Sunnyvale; Richard L. Pam, Menlo Park; Richard K. Tidball, Fremont; Robert M. Kendall, Sunnyvale, all of Calif.

[73] Assignee: Alzeta Corporation, Santa Clara, Calif.

[21] Appl. No.: 567,740

[22] Filed: Aug. 15, 1990

[51] Int. Cl.$^5$ .............................................. F23D 3/40
[52] U.S. Cl. ....................................... 431/7; 431/328; 431/329
[58] Field of Search ............... 431/7, 172, 328, 329, 431/238, 11, 166; 432/175

[56] References Cited

U.S. PATENT DOCUMENTS

| | | | |
|---|---|---|---|
| 2,828,813 | 4/1958 | Holden | 431/328 |
| 3,110,300 | 11/1963 | Brown et al. | 431/329 |
| 3,733,164 | 5/1973 | Westlake | 431/328 |
| 4,269,590 | 5/1981 | Baumanns | 431/328 |
| 4,746,287 | 5/1988 | Lannutti | 431/328 |
| 4,813,396 | 3/1989 | Sargeant et al. | 431/7 |
| 4,865,543 | 9/1989 | Garbo | 431/166 |
| 4,899,696 | 2/1990 | Kennedy et al. | 431/328 |

Primary Examiner—Carroll B. Dority
Attorney, Agent, or Firm—Paul W. Garbo

[57] ABSTRACT

Remarkable suppression of the formation of pollutants: $NO_x$, CO and UHC, in the flameless combustion of gaseous fuel with excess air is achieved by passing the fuel and air through a porous surface combustor directly into an adiabatic zone, and by controlling the amount of excess air to be greater than about 50% but not greater than about 150% in excess of the stoichiometric requirement. The furnace with the adiabatic zone for the suppression of pollutants will preferably have a refractory body as part of the adiabatic zone.

21 Claims, 2 Drawing Sheets

ADIABATIC SURFACE COMBUSTION WITH EXCESS AIR

BACKGROUND OF THE INVENTION

This invention relates to adiabatic surface combustion with excess air to yield combustion products or flue gas with a limited content of atmospheric pollutants. More particularly, radiant, surface combustion burners are operated with excess air under conditions that ensure a remarkably low content of nitrogen oxides ($NO_x$), carbon monoxide (CO) and unburned hydrocarbons (UHC) in the resulting flue gas.

In recent years there has been a considerable expansion in the use of flameless surface combustion burners that yield a substantial portion of the combustion heat as infrared radiation. Hence, these burners are often referred to as radiant flameless burners.

There are several types of surface combustion burners that have been proposed. U.S. Pat. No. 3,833,338 to Badrock shows a burner having a layer of deformable, porous ceramic fibre material through which the air and gaseous fuel permeate to be ignited on the exposed surface of the layer. U.S. Pat. No. 4,252,520 to Bratko discloses an infrared burner that is formed of a pervious self-supporting matrix being a fibrous molded member of alumina silica composition with a substantial chromic oxide content. A radiant surface combustor that has been finding widening uses is basically described in U.S. Pat. No. 3,179,156 to Weiss et al as having a fibrous porous wall or layer deposited upon a screen. U.S. Pat. No. 3,383,159 to Smith teaches adding a small amount of aluminum powder to the fiber burner of Weiss et al. U.S. Pat. No. 4,746,287 to Lanutti offers the improvement of aluminum alloy powders in porous fiber burners.

U.S. Pat. No. 4,597,734 to McCausland et al discloses another type of surface combustion radiant burner wherein the porous wall or layer on which surface combustion is conducted is formed from randomly laid fibers of an iron, chromium and aluminum alloy having the property of forming an alumina layer on the metal surface upon heating in the presence of oxygen. Still another type of surface combustion burner is provided by using a reticulated ceramic structure, as taught by U.S. Pat. No. 4,568,595 to Morris, for the porous layer on which surface combustion is carried out. Such a porous surface combustor is more simply called a ceramic foam burner.

The various types of surface combustion burners have in common the structural feature of a wall or layer having a multiplicity of fine foramina or pores through which the mixture of gaseous fuel and air must pass before being ignited at the exterior face of that layer. Similarly, these various burners have in common the operational feature that the fuel-air mixture burns at the exterior face of the porous layer without discernible flame and that exterior face becomes incandescent. Hence, these burners are often referred to as flameless and/or radiant surface combustion burners.

For the purposes of this invention, the various types of surface combustion burners will be included in the simple generic term, porous surface combustor. Compared to other burners that produce flames, porous surface combustors have the distinct advantage of yielding comparatively small amounts of the atmospheric pollutants: $NO_x$, CO and UHC. However, these small amounts of pollutants are achieved only if the quantity of excess air used in the combustion mixture is not large. U.S. Pat. No. 4,519,770 shows graphically in FIG. 6 that CO remains below 30 parts per million (ppm) in the flue gas so long as the air fed to the porous surface combustor does not exceed 50% in excess of the stoichiometric requirement. Similarly, UHC remains at about 2 ppm over the same limited range of excess air. At excess air quantities greater than 50%, the quantities of CO and UHC increase tremendously. Fortunately, $NO_x$ is generated in very small amounts at all levels of excess air; in fact, the suppression of $NO_x$ emission is an important characteristic of porous surface combustors that is responsible for the growing uses of these burners.

The use of a low amount of excess air is often desirable and advantageous. For example, where combustion heat is utilized indirectly to heat a fluid flowing through a metal tube as in the generation of steam, minimizing excess air minimizes the amount of heat lost with the vented flue gas. However, there are many cases where a large amount of excess air is preferred; for instance, where combustion heat is used directly by passing the hot products of combustion or flue gas in contact with a material such as rice to effect dehydration or a freshly coated paper to dry the coating. High excess air is also favored where the hot flue gas is discharged into a space such as a hog barn or a greenhouse to convey heat directly thereto. An environmentally important use of high excess combustion air is in the combustive clean-up of vitiated air resulting from some industrial operations like spray-painting because in such case for the sake of economy the object is to add the least amount of fuel that will achieve the combustive destruction of the pollutants in the vitiated air.

Accordingly, a principal object of this invention is to make it possible to operate porous surface combustors with more than 50% excess air while suppressing the formation of $NO_x$, CO and UHC.

Another important object is to provide simple means for attaining the desired results.

Other features and advantages of the invention will be apparent from the description which follows:

SUMMARY OF THE INVENTION

In accordance with this invention, the operation of a porous surface combustor with more than 50% excess air to suppress the formation of $NO_x$, CO and UHC comprises providing an adiabatic zone into which a mixture of gaseous fuel and excess air discharges from the porous surface combustor to effect flameless combustion thereof, and controlling the flameless combustion with an amount of excess air that is greater than about 50% but not greater than about 150% in excess of the stoichiometric requirement so as to yield a combustion product stream or flue gas containing not more than 10 ppm $NO_x$, 30 ppm CO and 10 ppm UHC. Preferably, the excess air is controlled to be in the range of about 60% to 120% in excess of the stoichiometric requirement thereby ensuring that the three atmospheric pollutants will be well below the aforementioned maximum limits.

Beneficial to the attainment of a small content of pollutants in the flue gas is the presence of a refractory body in the adiabatic zone spaced from the porous surface combustor. The term, refractory body, is used herein to include not just refractory insulation but any material or combination of materials that substantially prevents the dissipation of heat from the adiabatic zone.

Theoretically, an adiabatic zone is one that is completely free of heat loss. However, this theoretical limit of zero heat loss is not realized in practical embodiments of an adiabatic zone. Hence, for the purposes of this invention, an adiabatic zone is one in which at least 90% of the heat input to the zone leaves with the flue gas discharging therefrom. In other words, not more than 10% of the combustion heat can be lost by conduction through a refractory wall that confines the adiabatic zone.

Also, the adiabatic zone may be provided with a heat exchange tube or coil through which combustion air can be passed to effect preheating thereof before introduction into the porous surface combustor; obviously, the heat taken from the adiabatic zone by the air is substantially completely returned to the adiabatic zone. An important embodiment of the invention is the production of a hot flue gas well suited for direct contact with materials; examples of such direct contact are discharging the hot flue gas into a poultry house and using it to dehydrate a grain. In the production of such hot air, when the gaseous fuel is fed to the porous surface combustor together with excess air in an amount not greater than about 70% in excess of the stoichiometric requirement, it is advisable to pass an auxiliary air stream through a heat exchange coil or the like within the adiabatic zone to bring the temperature at the porous surface of the combustor down to not more than about 2000° F. The amount of auxiliary air is limited so that the combination of excess air fed to the porous surface combustor and auxiliary air is still within the aforesaid maximum of 150% excess air. Clearly, the mixture of heated auxiliary air and hot flue gas exiting the adiabatic zone will have substantially all of the heat input in the adiabatic zone save for the heat leak up to a maximum of 10% as already explained in defining the adiabatic zone of this invention.

As already discussed, there are several types of porous surface combustors that can be used in accordance with this invention. A particularly successful and preferred porous surface combustor is the one in which the porous surface is in the form of a porous layer of ceramic fibers deposited on, and adherent to, a metal screen as taught by U.S. Pat. No. 3,179,156. To enhance the suppression of CO formation, it is advisable to have a small amount of fine aluminum powder uniformly distributed in the porous fiber layer. Perforated metal and expanded metal may be substituted for the metal screen and therefore are the equivalents thereof.

A novel and improved furnace for the practice of the invention may take any of several simple forms as discussed hereinbelow.

BRIEF DESCRIPTION OF THE DRAWINGS

To facilitate the further description and understanding of the invention, reference will be made to the accompanying drawings of which.

DESCRIPTION OF PREFERRED EMBODIMENTS

Figure 1:
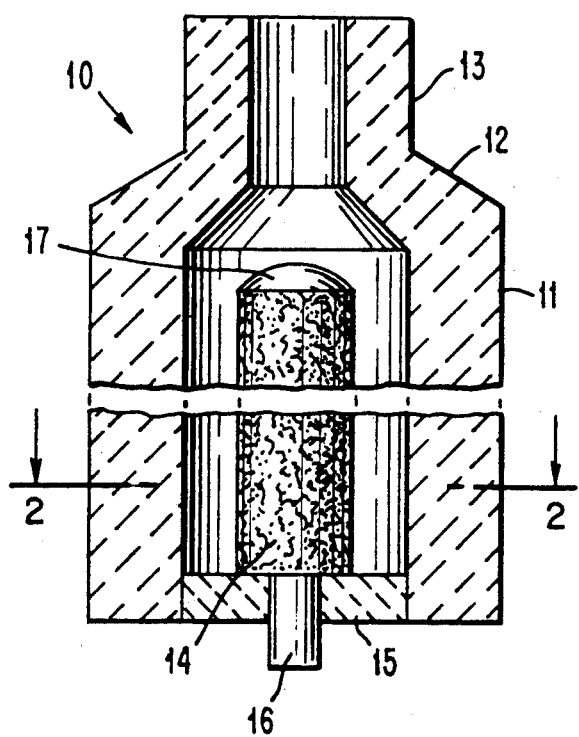
FIG. 1 is a more or less diagrammatic sectional elevation of one form of furnace for the practice of the invention.
Figure 2:
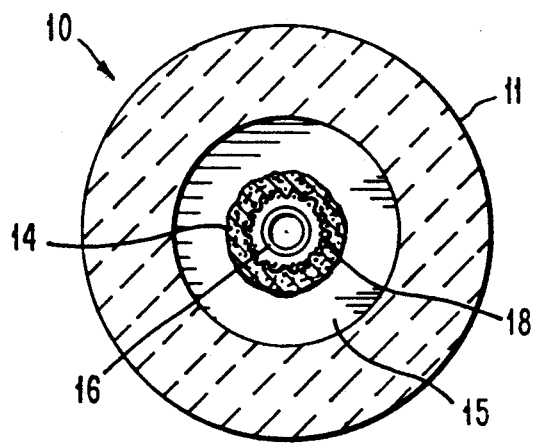
FIG. 2 is a sectional view taken along the line 2—2 of FIG. 1.

FIGS. 1 and 2 depict a cylindrical furnace 10 having cylindrical refractory wall 11, conical section 12 and stack 13. Porous fiber burner 14 of the type disclosed in U.S. Pat. No. 3,383,159 is positioned concentrically within cylindrical wall 11 on refractory slab 15 at the base of furnace 10. Pipe 16 for the introduction of a mixture of fuel gas and air is connected to the bottom end of burner 14 and extends through slab 15. Burner 14 has a porous layer of ceramic fibers deposited on an inner sleeve formed by a metal screen. This cylindrical porous fiber layer provides the outer surface on which flameless combustion takes place and which becomes radiant. The top end of burner 14 is closed by refractory plug 17. The metal screen sleeve 18 within burner 14 is seen in FIG. 2.

Figure 3:
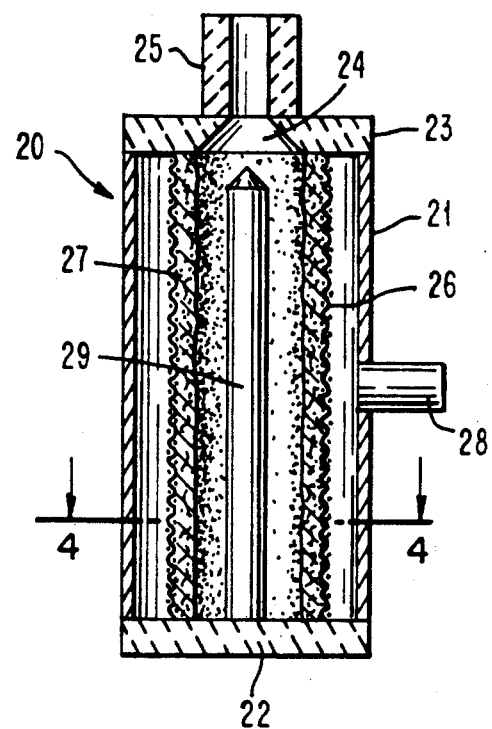
FIG. 3 is a more or less diagrammatic sectional elevation of another form of furnace for the practice of the invention.
Figure 4:
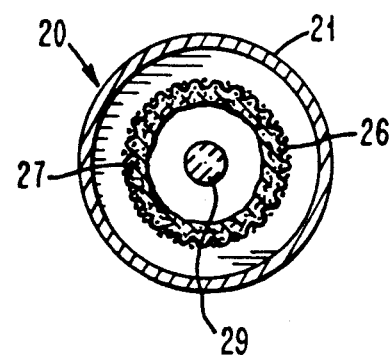
FIG. 4 is a sectional view taken along the line 4—4 of FIG. 3.

FIGS. 3 and 4 show another cylindrical furnace 20 having steel sheel 21, refractory base 22, top refractory slab 23 with tapered central opening 24, and refractory stack 25 disposed over opening 24. A cylindrical sleeve 26 formed by a metal screen is within shell 21 and concentric therewith. The inner side of screen sleeve 26 has the same porous layer 27 of ceramic fibers deposited thereon as already described for burner 14 of FIGS. 1 and 2. Pipe 28 connected to shell 21 is used to feed a fuel gas-air mixture into the annular space between shell 21 and the burner formed by screen 26 and porous fiber layer 27. Surface combustion takes place on the face of layer 27 that is not in contact with screen 26.

Comparing the operation of burner 14 of FIGS. 1 and 2 with that of burner 27 of FIGS. 3 and 4, it is clear that burner 14 is fired outwardly so that its radiant surface faces refractory wall 11, while burner 27 is fired inwardly so that its radiant surface faces itself. However, it is preferred to have the infrared radiation emitted by the burner impinge on a refractory target. Therefore, for this optional preferred form of furnace 20, a refractory column or core 29 is set at the axis of shell 21. In this way, infrared radiation from porous fiber layer 27 will impinge on refractory core 29. While core 29 is circular in cross-section as shown in FIG. 4, it may have other shapes such as square or hexagonal. The same is true of the cross-sections of burners 14 and 27 taken normal to their axes. The circular shape is of course the simplest and easiest to fabricate.

Figure 5:
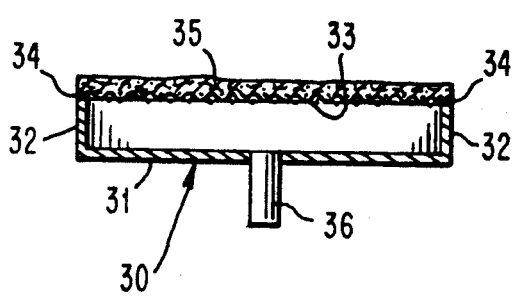
FIG. 5 is a sectional view of a rectangular pan-type porous surface combustor.

FIG. 5 is a cross-section of pan-type porous surface combustor 30 transverse to its length. Metal pan 31 has side walls 32 with screen 33 welded to the ends 34 of side walls 32. A porous layer 35 of ceramic fibers is deposited on, and attached to, screen 33. The porous layer 35 provides the exposed surface at which a mixture of fuel gas and air will burn without visible flame and become radiant. The fuel gas-air mixture is fed to combustor 30 through pipe 36 connected to metal pan 31.

Figure 6:
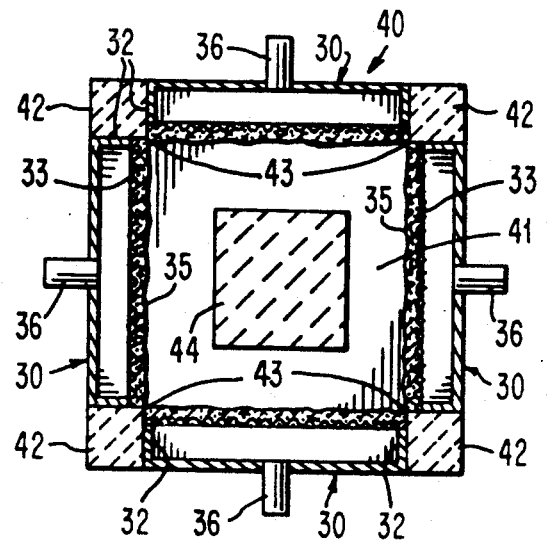
FIG. 6 is a diagrammatic sectional plan view of four combustors of FIG. 5 arranged to form a furnace for the practice of the invention.

FIG. 6 forms a furnace 40 useful for the practice of this invention by having four surface combustors 30 of FIG. 5 arranged to provide a square adiabatic zone 41. Where each pair of combustors 30 meet at right angles to one another, a refractory post 42 is cemented to the side walls 32 of the contiguous burners 30 so that the products of combustion or flue gas cannot leak along the vertical (normal to FIG. 6) juncture line 43 of contiguous burners 30. By this arrangement, the four burners 30 act as an inwardly fired furnace similar to inwardly fired porous surface combustor 27 of FIGS. 3 and 4. In short, FIG. 6 demonstrates that a furnace suitable for this invention may be formed of modular burners 30 and will function comparably to the unitary burner 27 of FIGS. 3 and 4. Likewise, preferably furnace 40 has a square refractory core 44 set in its center so that infrared radiation from the four porous fiber layers 35 will impinge thereon. Optional core 44 serves the same purpose of core 29 in FIGS. 3 and 4. It is understood that furnace 40 will have a base slab and a top slab with a stack opening similar to base slab 22 and top slab 23 of FIG. 3.

Figure 7:
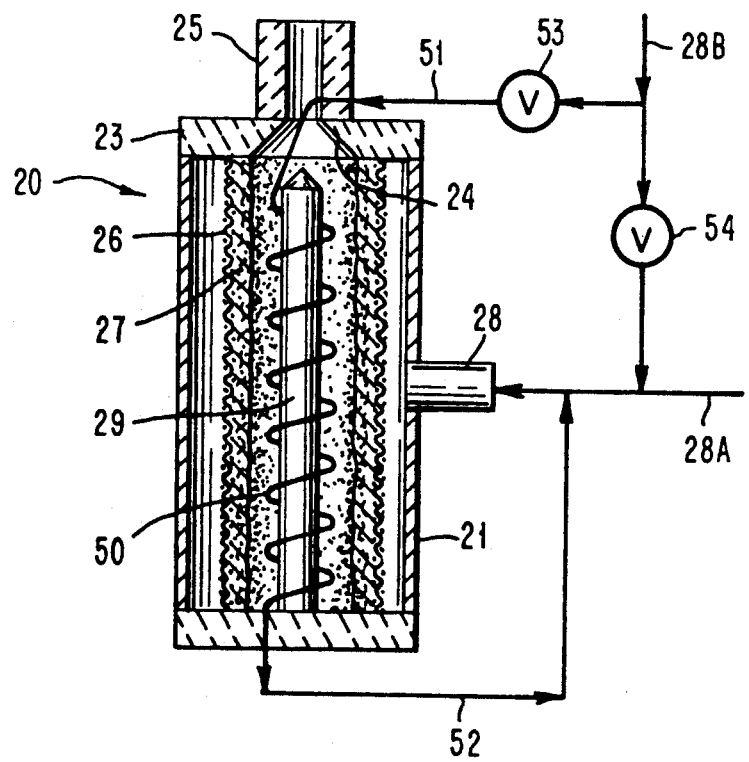
FIG. 7 is a modification of FIG. 3.

FIG. 7 shows a modification of FIG. 3 wherein a heat exchange coil 50 is positioned within the adiabatic zone in furnace 20. Coil 50 has inlet line 51 and outlet line 52 which discharges into line 28A. Line 28A represents the introduction of fuel gas to pipe 28 and line 28B represents the introduction of air into line 28A to form the fuel gas-air mixture supplied to burner 27 through pipe 28. Air line 28B has branch line 51 with control valve 53 and downstream from branch line 51 air line 28B has control valve 54.

When valve 53 is closed and valve 54 is open, the operation of modified furnace 20 of FIG. 7 is identical to that of furnace 20 of FIG. 3. By opening valve 53 some or all of the air to be supplied to burner 27, depending on the amount of closure of valve 54, is heated by passage through coil 50 before entering pipe 28. By closing valve 54, all of the air is preheated before mixing with the fuel gas. Whether all or part of the air used in the combustion of the fuel gas is preheated in coil 50, all of the heat absorbed by the air is returned to the adiabatic zone so that there is no loss of heat therefrom.

In a specific example of the invention, using the furnace of FIGS. 1 and 2, natural gas is fed to porous surface combustor 14 with excess air in the amount of 75% in excess of the stoichiometric requirement. The natural gas is burned by flameless combustion at the rate of 100,000 BTU per square foot (hourly) of porous surface of combustor 14 with the result that the combustion product stream or flue gas leaving the adiabatic zone of furnace 10 through stack 13 contains a remarkably small amount by volume of atmospheric pollutants, namely, 1.3 ppm $NO_x$, 10 ppm CO and no detectable UHC. This hot product gas stream is well suited for directly contacting a sliced fruit such as apricots to effect dehydration or for discharging directly into a poultry house to maintain a warm atmosphere therein. The hot product gas stream can also be employed in the spray-drying of dairy products or pharmaceuticals without causing any damage to the final dry products. Ordinarily, a hot flue gas with the usual content of $NO_x$, CO and UHC cannot be used in the spray-drying of dairy products and pharmaceuticals because the pollutants adversely affect the final products in one or more characteristics such as color and taste.

While the foregoing description of the invention has chiefly referred to a porous surface combustor of the type having a porous layer of ceramic fibers attached to a thin perforated metal support, the other types of available porous surface combustors are practical substitutes therefor. The metal fiber burner of U.S. Pat. No. 4,597,734 will probably find more frequest use in furnaces of this invention if the cost is reduced.

Those skilled in the art will readily visualize variations and modifications of the invention as illustrated and described herein without departing from the spirit or scope of the invention. For example, furnace 10 of FIG. 2 could have an elliptical instead of circular cross-section with a burner 14 positioned at each of its two foci. Also, a refractory column, similar to refractory bodies 29,44, can be set in the elliptical furnace at the midpoint between the two burners 14. Of course, the four pipes 36 of FIG. 6 can be connected to a common manifold that will supply a mixture of gaseous fuel and excess air to the four porous surface combustors 30. The gaseous fuel, usually natural gas, can be any completely vaporized hydrocarbon or alcohol such as methanol. Inasmuch as the process of the invention is valuable in the combustive destruction of not only organic compounds such as solvents but also noxious wastes such as halogenated organic compounds, such combustibles fed to the porous surface combustor are to be considered as part of the gaseous fuel in controlling the amount of excess air in accordance with this invention. While the illustrative furnaces are vertical, horizontal furnaces will perform just as well. Accordingly, only such limitations should be imposed on the invention as are set forth in the appended claim.

What is claimed is:

1. In a furnace for producing combustion gases containing not more than 10 ppm $NO_x$, 30 ppm CO and 10 ppm UHC, the improvement which comprises a combustion cavity devoid of heat exchange means, a porous surface combustor arranged with its porous surface exposed to said combustion cavity, and a refractory body that is within and surrounded by said combustion cavity to reradiate heat to said porous surface, said combustion cavity having an exit for exhausting said combustion gases.

2. The improved furnace of claim 1 wherein the porous surface combustor is substantially cylindrical with its porous surface surrounding the combustion cavity, and the refractory body extends along the axial center of said combustion cavity.

3. The improved furnace of claim 1 wherein the porous surface combustor has its porous surface in the form of a porous layer of ceramic fibers deposited on, and adherent to, a metal screen.

4. The improved furnace of claim 3 wherein the porous layer of ceramic fibers contains a small amount of fine aluminum powder uniformly distributed therein.

5. The improved furnace of claim 4 wherein the porous surface combustor is substantially cylindrical with its porous surface surrounding the combustion cavity, and the refractory body extends along the axial center of said combustion cavity.

6. The method of suppressing the formation of $NO_x$, CO and UHC in burning a gaseous fuel with excess air by passage through a porous surface combustor wherein its porous surface is in the form of porous layer of ceramic fibers deposited on, and adherent to, a metal screen, which comprises providing a furnace with a combustion zone into which said gaseous fuel with excess air discharges from said porous surface combustor to effect flameless combustion, said combustion zone being devoid of heat exchange means, and controlling said flameless combustion with an amount of excess air passed through said porous surface combustor that is greater than about 50% but not greater than about 150% in excess of the stoichiometric requirement so as to yield a combustion product gas containing not more than 10 ppm $NO_x$, 30 ppm CO and 10 ppm UHC.

7. The method of claim 6 wherein the amount of excess air is greater than about 60% but not greater than about 120% in excess of the stoichiometric requirement.

8. The method of operating a porous surface combustor, wherein its porous surface is in the form of a porous layer of ceramic fibers deposited on, and adherent to, a metal screen, with more than about 50% excess air to suppress the formation of $NO_x$, CO and UHC during combustion, which comprises positioning said combustor with its porous surface exposed to the combustion zone in a furnace, said combustion zone being devoid of heat exchange means, passing a mixture of gaseous fuel and excess air through said porous surface to conduct flameless combustion thereon within said combustion zone, said excess air being controlled to an amount greater than about 50% but not greater than about 150% in excess of the stoichiometric requirement, and withdrawing from said combustion zone the resulting flue gas containing not more than 10 ppm $NO_x$, 30 ppm CO and 10 ppm UHC.

9. The method of operating a porous surface combustor, wherein its porous surface is in the form of a porous layer of ceramic fibers deposited on, and adherent to, a metal screen, with more than about 50% excess air to suppress the formation of $NO_x$, CO and UHC during combustion, which comprises positioning said combustor with its porous surface exposed to the combustion zone in a furnace, said combustion zone being devoid of heat exchange means and surrounding a refractory body spaced from said porous surface to reradiate heat thereto, passing a mixture of gaseous fuel and excess air through said porous surface to conduct flameless combustion thereon within said combustion zone, said excess air being controlled to an amount greater than about 50% but not greater than about 150% in excess of the stoichiometric requirement, and withdrawing from said combustion zone the resulting flue gas containing not more than 10 ppm $NO_x$, 30 ppm CO and 10 ppm UHC.

10. The method of claim 9 wherein the amount of excess air is greater than about 60% but not greater than about 120% in excess of the stoichiometric requirement.

11. The method of claim 9 wherein the porous layer of ceramic fibers contains a small amount of fine aluminum powder uniformly distributed therein.

12. The method of claim 11 wherein the amount of excess air is greater than about 60% but not greater than about 120% in excess of the stoichiometric requirement.

13. The method of claim 8 wherein the porous surface combustor is substantially cylindrical with its porous surface surrounding the combustion zone.

14. The method of claim 13 wherein the porous layer of ceramic fibers contains a small amount of aluminum or aluminum alloy powder uniformly distributed therein.

15. The method of operating a porous surface combustor, wherein its porous surface is in the form of a porous layer of ceramic fibers deposited on, and adherent to, a metal screen, with more than about 50% excess air to suppress the formation of $NO_x$, CO and UHC during combustion, which comprises positioning said combustor with its porous surface exposed to the combustion zone in a furnace, said combustion zone being provided with heat exchange means solely for preheating air, preheating air by passage through said heat exchange means within said combustion zone, passing a mixture of gaseous fuel and excess air including the preheated air through said porous surface to conduct flameless combustion thereon within said combustion zone, said excess air being controlled to an amount greater than about 50% but not greater than about 150% in excess of the stoichiometric requirement, and withdrawing from said combustion zone the resulting flue gas containing not more than 10 ppm $NO_x$, 30 ppm CO and 10 ppm UHC.

16. The method of claim 15 wherein the porous surface combustion is substantially cylindrical with its porous surface surrounding the porous surface, and said porous surface combustion.

17. The method of claim 16 wherein the porous layer of ceramic fibers contains a small amount of aluminum or aluminum alloy powder uniformly distributed therein.

18. The method of claim 16 wherein the amount of excess air is greater than about 60% but not greater than about 120% in excess of the stoichiometric requirement.

19. In a furnace for producing combustion gases containing not more than 10 ppm $NO_x$, 30 ppm CO and 10 ppm UHC, the improvement which comprises a combustion cavity devoid of heat exchange means except for a heat exchanger connected to pass air therethrough and into a porous surface combustor to convey heat thereto, said porous surface combustor arranged with its porous surface exposed to said combustion cavity, and an exit for exhausting said combustion gases from said combustion cavity.

20. The method of suppressing the formation of $NO_x$, CO and UHC in burning a gaseous fuel with excess air by passage through a porous surface combustor wherein its porous surface is in the form of a porous layer of ceramic fibers deposited on, and adherent to, a metal screen , which comprises providing a furnace with a combustion zone into which said gaseous fuel with excess air discharges from said porous surface combustor to effect flameless combustion, said combustion zone being devoid of heat exchange means and surrounding a refractory body spaced from said porous surface combustor to reradiate heat thereto, and controlling said flameless combustion with an amount of excess air passed through said porous surface combustor that is greater than about 50% but not greater than about 150% in excess of the stoichiometric requirement so as to yield a combustion product gas containing not more than 10 ppm $NO_x$, 30 ppm CO and 10 ppm UHC.

21. The method of claim 20 wherein the amount of excess air is greater than about 60% but not greater than about 120% in excess of the stoichiometric requirement.

* * * * *